W. F. DUBERT.
STEERING GEAR.
APPLICATION FILED JAN. 17, 1916.
1,204,138.
Patented Nov. 7, 1916.
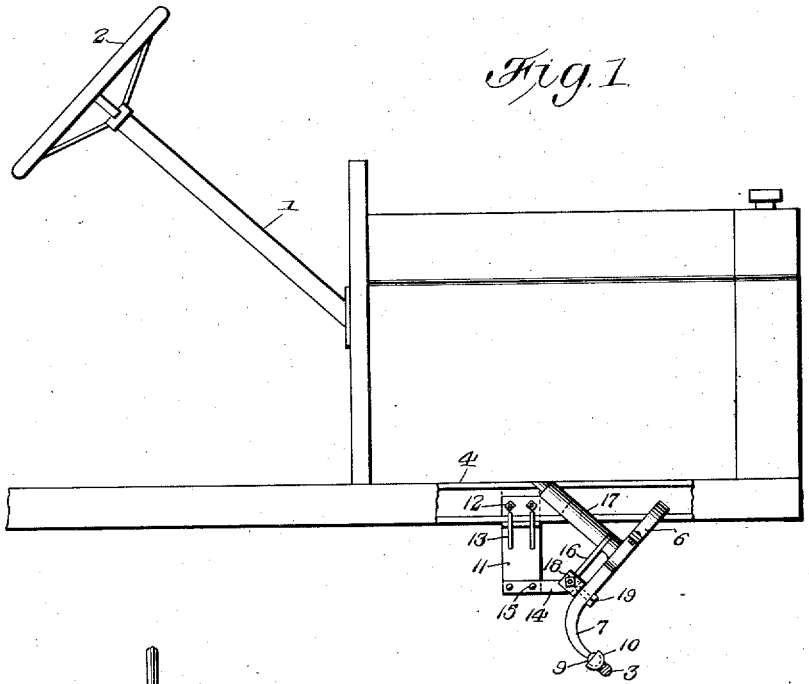
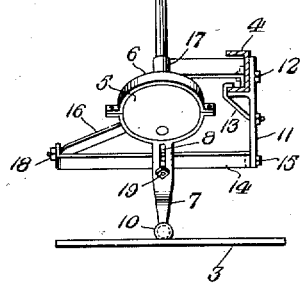
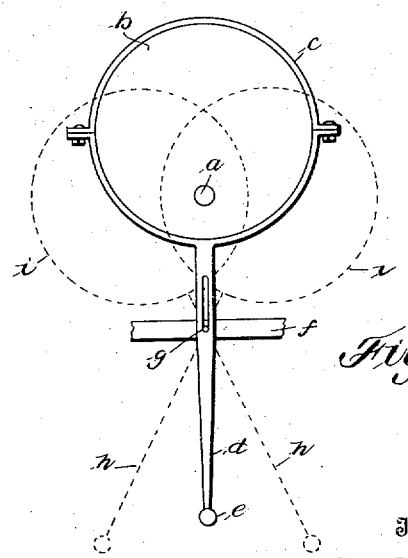
Witnesses
J H Crawford
R M Smith
Inventor
W. F. Dubert,
By Victor J. Evans
Attorney

UNITED STATES PATENT OFFICE.

WILLIAM F. DUBERT, OF FULTON, IOWA.

STEERING-GEAR.

1,204,138.

Specification of Letters Patent.  Patented Nov. 7, 1916.

Application filed January 17, 1916. Serial No. 72,581.

*To all whom it may concern:*

Be it known that I, WILLIAM F. DUBERT, a citizen of the United States, residing at Fulton, in the county of Jackson and State of Iowa, have invented new and useful Improvements in Steering-Gears, of which the following is a specification.

This invention relates to steering gear for vehicles and particularly automobiles, motor trucks and other motor propelled vehicles, the main object of the present invention being to produce novel connecting means between the steering shaft and steering rod of a vehicle including an eccentric and other elements whereby the vehicle, with the aid of the usual hand control wheel, may be easily steered, at the same time avoiding any possibility of the steering wheels of the machine reacting on the hand control wheel so as to snatch the said control wheel out of the hands of the operator, the construction being such that the steering wheels are in effect locked in whatever position they may be.

With the above and other objects in view, the invention consists in the novel construction, combination and arrangement of parts, as herein described, illustrated and claimed.

In the accompanying drawings:—Figure 1 is a view partly in side elevation and partly in section illustrating the steering gear of this invention in its relation to the steering shaft and steering rod of an automobile. Fig. 2 is a front elevation of the same, showing a portion of the frame in cross section. Fig. 3 is a diagrammatic view illustrating the action of the steering gear.

Referring to the drawings, 1 designates the steering shaft of a motor vehicle, 2 the hand wheel thereof by means of which the vehicle is steered by the driver, 3 the steering rod or rod which is usually coupled to the connecting rod which extends between the steering knuckles of the front wheels of the machine, and 4 the frame of the machine, all of said parts being of the usual construction and arrangement at present in common use.

In carrying out the present invention, I remove the usual arm from the steering shaft 1, which arm connects directly with the steering rod 3 and in lieu thereof, an eccentric 5 is mounted upon the steering shaft and keyed or otherwise fastened thereto so as to turn therewith. A strap 6 encircles the eccentric 5 and is preferably of the split variety, being composed of two substantially semi-circular sections which are bolted or otherwise fastened together as shown, thereby enabling the strap to be placed around the eccentric and removed therefrom.

The eccentric strap 6 is provided with an arm 7 having a rigid or fixed relation to said strap and provided with a longitudinal slot 8 the purpose of which will presently appear, the arm 7 being terminally formed with the ball member 9 of a ball and socket joint, the socket 10 of which is at the adjacent portion of the steering rod 3.

11 designates a hanger or bracket which is fastened to one of the side bars of the frame 4 as illustrated in Figs. 1 and 2, 12 designating bolts and 13 designating braces for firmly securing the bracket 11 in fixed relation to the frame. At its extremity, a fulcrum support or bar 14 is secured in fixed relation to said bracket by means of a plurality of bolts 15 inserted through a corresponding number of holes in the extremity of the hanger 11 thus providing for an adjustment of the fulcrum support or bar 14 relatively to the hanger, after the latter has been adjusted to the desired point on the frame 4.

The extremity of the member 4 is supported by means of a brace 16 having an opening in the upper end thereof through which the steering shaft 1 passes, the upper end of the brace 16 being interposed between the hub of the eccentric 6 and the bearing 17 for the steering shaft 1. The other extremity of the brace 16 is inserted through a hole in the adjacent end of the member 14 and the members 14 and 16 are secured together in fixed but adjustable relation by means of nuts 18 threaded on the brace 16 at opposite sides of the extremity of the bar or support 14.

A fulcrum pin or pivot 19 projects from the bar or support 14 through the slot 8 in the arm 7 of the eccentric strap 6. In the turning movement of the eccentric 5, the arm 7 is caused to rock on the pivot 19 as a center and is also adapted to slide relatively to the pivot 15 in order to accommodate the movement of the eccentric strap.

From the foregoing description, taken in connection with the accompanying drawings, it will now be understood that when the operator, by means of the hand wheel 2, turns the shaft 1, the eccentric 5 is correspondingly turned thereby shifting the eccentric strap 6 and causing a rocking and sliding movement of the arm 7 in relation to its support. This causes the lower extremity of the arm 7 to move laterally to one side or the other in accordance with the direction in which the steering shaft is turned thereby imparting a corresponding movement to the steering rod 3 which operates and controls the front steering wheels of the machine. The steering gear of this invention operates with great ease when the hand wheel 2 is turned but in case the machine wheels strike ruts and obstructions the angle thereof is not disturbed so as to correspondingly affect the hand wheel 2. In other words, the steering gear is practically locked at all times and is only controllable by means of the hand wheel 2 and the steering shaft 1. This avoids any possibility of the hand wheel 2 being snatched out of the hands of the operator, thus avoiding many of the accidents which now result in the overturning or ditching of a car and other similar accidents.

The invention is particularly adapted for use in connection with cars of light weight, the steering gear, by reason of the locking action thereof, enabling such light machine to hold the road in the same manner as a heavier car.

In the diagram, Fig. 3, $a$ represents the steering shaft, $b$ the eccentric, $c$ the eccentric strap, $d$ the arm of the eccentric strap, $e$ the connection between said arm and the steering rod 3, $f$ the fulcrum support, and $g$ the pivot corresponding with the pivot 19 of the preceding figures. The dotted lines $h$ represent the extreme positions of the arm 7 while the dotted lines $i$ represent the corresponding positions of the eccentric strap.

Having thus described my invention, I claim:—

1. The combination with the steering shaft and steering rod of a vehicle, of an eccentric fast on the steering shaft, a strap encircling said eccentric, and an arm on said strap terminally jointed to said steering rod and pivotally and slidably mounted between the ends thereof.

2. The combination with the steering shaft and steering rod of a vehicle, of an eccentric fast on the steering shaft, a strap encircling said eccentric, an arm on said strap terminally jointed to said steering rod, and means for producing a pivoted and sliding action of said arm as the eccentric is turned by the steering shaft.

In testimony whereof I affix my signature in presence of two witnesses.

WILLIAM F. DUBERT.

Witnesses:
 ESTUS MORSE,
 Mrs. ESTUS MORSE.